US006388621B1

(12) United States Patent
Lynch

(10) Patent No.: US 6,388,621 B1
(45) Date of Patent: May 14, 2002

(54) OPTICALLY TRANSPARENT PHASE ARRAY ANTENNA

(75) Inventor: Michael J. Lynch, Merritt Island, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/598,002

(22) Filed: Jun. 20, 2000

(51) Int. Cl.[7] ................................................ H01G 1/38

(52) U.S. Cl. ............................... 343/700 MS; 343/770; 343/848

(58) Field of Search .......................... 343/700 MS, 767, 343/770, 846, 848, 818, 819

(56) References Cited

U.S. PATENT DOCUMENTS

| | | | | | |
|---|---|---|---|---|---|
| 4,218,682 | A | | 8/1980 | Yu | 343/700 |
| 4,543,579 | A | | 9/1985 | Teshirogi | 343/365 |
| 4,633,262 | A | | 12/1986 | Traut | 343/700 |
| 4,639,732 | A | * | 1/1987 | Acoraci et al. | 342/371 |
| 4,737,793 | A | | 4/1988 | Munson et al. | 342/361 |
| 4,791,428 | A | | 12/1988 | Anderson | 343/758 |
| 4,849,766 | A | | 7/1989 | Inaba et al. | 343/713 |
| 4,887,089 | A | | 12/1989 | Shibata et al. | 343/700 |
| 4,914,448 | A | | 4/1990 | Otsuka et al. | 343/872 |
| 4,958,165 | A | | 9/1990 | Axford et al. | 343/770 |
| 5,181,042 | A | | 1/1993 | Kaise et al. | 343/700 |
| 5,189,433 | A | | 2/1993 | Stern et al. | 343/770 |
| 5,210,541 | A | | 5/1993 | Hall et al. | 343/700 |
| 5,231,406 | A | | 7/1993 | Sreenivas | 343/700 |
| 5,270,721 | A | | 12/1993 | Tsukamoto et al. | 343/700 |
| 5,373,306 | A | | 12/1994 | Amore et al. | 343/872 |
| 5,534,877 | A | * | 7/1996 | Sorbello et al. | 343/700 MS |
| 5,561,434 | A | | 10/1996 | Yamazaki | 343/700 |
| 5,627,548 | A | * | 5/1997 | Woo et al. | 342/357 |
| 5,689,276 | A | | 11/1997 | Uematsu et al. | 343/872 |
| 5,712,645 | A | | 1/1998 | Jellum et al. | 343/713 |
| 5,714,961 | A | | 2/1998 | Kot et al. | 343/769 |
| 5,872,542 | A | | 2/1999 | Simons et al. | 343/700 |
| 6,031,491 | A | | 2/2000 | Daniel et al. | 343/700 |
| 6,121,880 | A | * | 9/2000 | Scott et al. | 340/572.5 |

FOREIGN PATENT DOCUMENTS

| | | | | |
|---|---|---|---|---|
| FR | 2 405 561 | | 10/1977 | |
| JP | 0911906 A2 | * | 4/1999 | H01Q/9/04 |

OTHER PUBLICATIONS

Patent Abstracts of Japan, vol. 010, No. 352, Nov. 27, 1986, and JP 61 150402 A (Matsushita Electric Works Ltd.), Jul. 9, 1986, one page.

Patent Abstracts of Japan, vol. 010, No. 386, Dec. 24, 1986, and JP 61 176201 A (Yagi Antenna Co. Ltd.), Aug. 7, 1986, one page.

* cited by examiner

*Primary Examiner*—Don Wong
*Assistant Examiner*—Shih-Chao Chen
(74) *Attorney, Agent, or Firm*—Allen, Dyer, Doppelt, Milbrath & Gilchrist, P.A.

(57) ABSTRACT

A phase array antenna of the present invention includes a dielectric layer formed of a material that is optically transparent. An electrically conductive and optically transparent ground plane layer is secured on one side of the dielectric layer. An array of optically transparent antenna elements are positioned over the opposing side of the dielectric layer from the ground plane layer. An optically transparent beam forming network is formed on the dielectric layer on the same side as the optically transparent antenna elements and is operatively connected to the array of optically transparent antenna elements.

21 Claims, 7 Drawing Sheets

AZIMUTH

ELEVATION

OPTICALLY TRANSPARENT PHASE ARRAY ANTENNA

FIELD OF THE INVENTION

This invention relates to the field of phase array antennas, and more particularly, this invention relates to the field of phase array antennas as applied for satellite communication or terrestrial point-to-point applications.

BACKGROUND OF THE INVENTION

In U.S. patent application Ser. No. 09/361,082, a planar configured phase array antenna allows a user to select a desired beam angle in a simplified phase array antenna structure that can be mounted on a surface, such as a chimney, arid allows a user to select the beam angle and scan the beam based on the location of the array antenna and the location of a satellite of interest.

This type of phase array antenna solved prior art problems related to the type of applications where terrestrial point-to-point communications links used parabolic antennas mounted on the roof or sides of buildings. Households in residential areas typically use a parabolic antenna to receive electromagnetic waves from a broadcast satellite. Because this type of satellite dish has a beam that points out of a reflector, it must be mounted away from the house in order to tilt the dish and point it at the sky. The dish is sometimes also mounted on the roof or balcony of a house and directed at a satellite. This type of dish antenna typically comprises a reflector, feedhorn element and a converter, with the feedhorn and converter disposed on the focal position of the reflector. In heavy winds, the satellite dish can be broken. Additionally, a parabolic antenna is sometimes unsightly and spoils the aesthetic appearance of many buildings or houses.

A planar antenna can sometimes be used and placed directly on the side of the building or house to add strength to the antenna and also make its appearance more aesthetic. However, if the beam comes directly out of the surface ("on bore site"), the antenna will be directed at the building next door when mounted on a vertical surface.

Some microstrip array antennas have been designed to have a beam tilt such that a beam radiated from the antenna is deviated from a direction perpendicular to the plane of the antenna. For example, an antenna could be given a beam tilt of 23 or 27 degrees. The beam Lilt can be obtained by giving phase differences to a plurality of radiating elements that constitute a phase array. An example of such antenna is disclosed in U.S. Pat. No. 5,181,042 to Kaise et al., where a planar microstrip array antenna has a beam tilt that is formed from a plurality of pairs of circularly polarized wave radiating elements.

However, in the Kaise et al. patent, the antenna has one fixed scan angle and the beam scan is fixed in the beam former. No adjustment, or more importantly, selection of possible scan angles is possible.

U.S. Pat. No. 5,189,433 to Stern et al. discloses a slotted microstrip electronic scan antenna where a network of strip lines are mounted on an opposed surface of a dielectric substrate. A scanning circuit is connected to control terminals of circulators for selectively completing a radio frequency transmission path between an input/output stripline and coupling strip lines. Each linear array is directional, having a major lobe and each major lobe is oriented in a different direction. The scanning circuit is periodically switched between the linear arrays, and causes the antenna to scan a region of space via a different major lobe. Although the beam can be scanned, the Stern et al. solution is not a simple low cost implementation, such as could be used for terrestrial point-to-point or TV receive applications where an electrical scan capability would not be required as in the Stern et al. patent.

U.S. Pat. No. 5,210,541 to Hall et al. discloses a patch antenna array having multiple beam-forming capability using a feed network on a microstrip substrate with patches overlaying an upper substrate. Linear series-connected patch arrays are each resonant and may have open circuits at each end. A traveling wave arrangement of feed lines is provided, and in one embodiment, the total number of beams can be generated as twice the number of feed lines. Again, a simplified selectable structure to scan the beam to a desired location such that a user can obtain a desired and scanned beam at a predetermined location is not disclosed.

The antenna structure as disclosed in the '082 patent application solves the above-mentioned problem by using a planar configured housing that mounts a dielectric substrate layer and other elements of a phase array antenna. The frame supports the housing and is adapted to be placed on a planar support surface, such as a chimney or side of the house. The housing can be rotated relative to the frame for adjusting azimuth. A plug-in card can be inserted within a plug-in card slot and has signal tracks operatively connected to respective signal tracks extending along the substrate layer. Each of the signal tracks within the plug-in card are formed to have a desired phase shift to scan the beam to a desired location.

However, the antennas as described above are planar but are still opaque. This type of antenna could never be mounted on a window without obstructing one's view.

SUMMARY OF THE INVENTION

It is therefore an object of the present invention to provide a planar configured phase array antenna that is optically transparent and adapted for mounting on the surface of a flat surface.

It is still another object of the present invention to provide an optically transparent phase array antenna that allows a user to select the desired beam angle.

In accordance with the present invention, a phase array antenna of the present invention includes a dielectric layer formed of a material that is optically transparent. An electrically conductive and optically transparent ground plane layer is secured on one side of the dielectric layer. An array of optically transparent antenna elements are positioned over the opposing side of the dielectric layer from the ground plane layer. An optically transparent beam forming network is formed on the dielectric layer on the same side as the optically transparent antenna elements and is operatively connected to the array of optically transparent antenna elements.

An optically transparent adhesive layer is formed on the ground plane layer opposite the dielectric layer for adhesively securing the phase array antenna to a surface. The optically transparent beam forming network is formed from indium tin oxide in one aspect of the present invention. In another aspect of the present invention, the beam forming network can comprise microstrip signal tracks, and the antenna elements comprise radiating patch antenna elements. The antenna elements can also comprise slots that are arranged in rows where each beam forming network comprises microstrip signal tracks that extend onto respective slots. A second optically transparent dielectric Layer is formed over the dielectric layer having the attached ground plane layer. An optically transparent conducting layer is formed on the second dielectric layer and has slots formed therein. Each row has a predetermined slot spacing and dimension for receiving a predetermined center operating frequency of a receive signal.

In yet another aspect of the present invention, the plug-in slot is operatively connected to the beam forming network and configured for receiving a plug-in card and connecting to a beam forming network contained within the plug-in card for imparting a desired phase shift and scanning the beam to a desired location. A directional guide indicates direction in which the phase array antenna has been mounted on the surface. This directional guide can include a display that communicates what plug-in card should be received within the plug-in slot.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

In accordance with the present invention, the phase array antenna is simple in construction and allows a user to select a desired beam scan angle, such as based on the direction where the phase array is positioned on the building or house, and geographically positioned at a location. However, it also is optically transparent such that it can be mounted on a window pane without disturbing views through the window. It can also be mounted on the side of a house, and because it is optically transparent, any underlying bricks or wall surface will show, making the application aesthetically pleasing.

Figure 1:
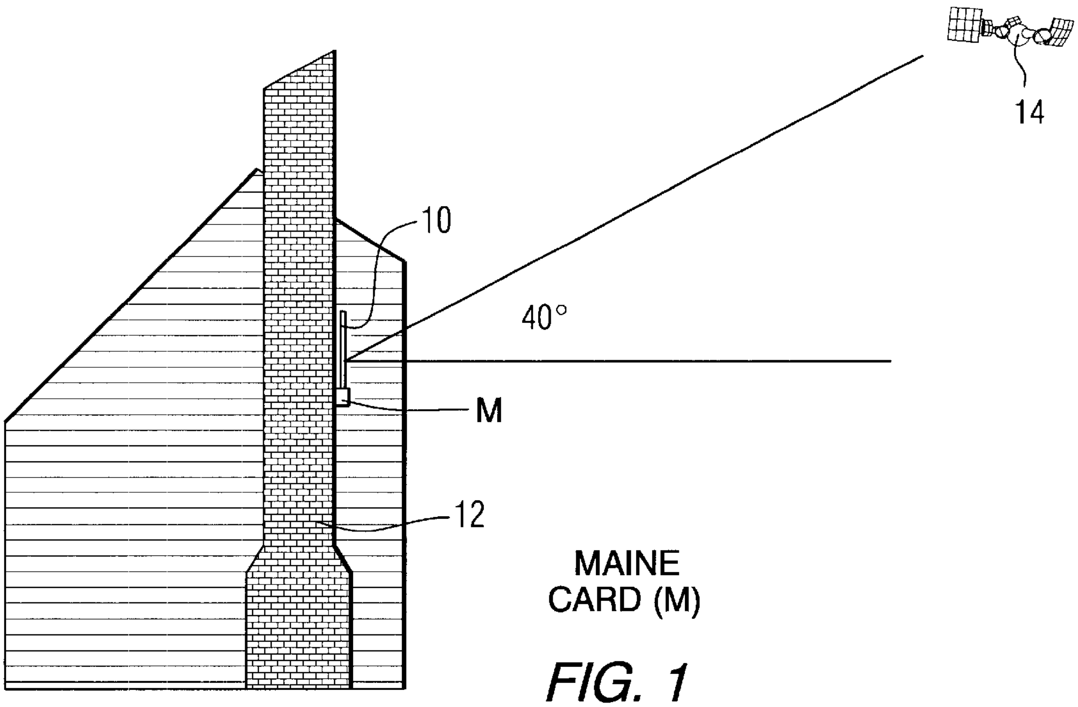
FIG. 1 is a schematic view showing a planar phase array antenna of the present invention with one card inserted that produces a main beam located 40° off bore site.
Figure 2:
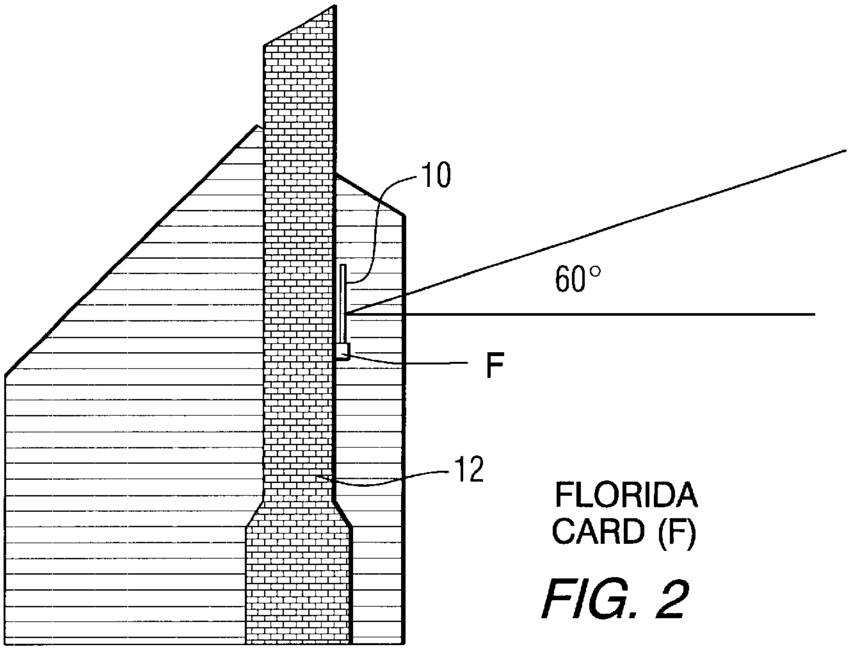
FIG. 2 is another view similar to FIG. 1 showing a phase array antenna of the present invention using a second card producing a main beam located 60° off bore site.
Figure 5:
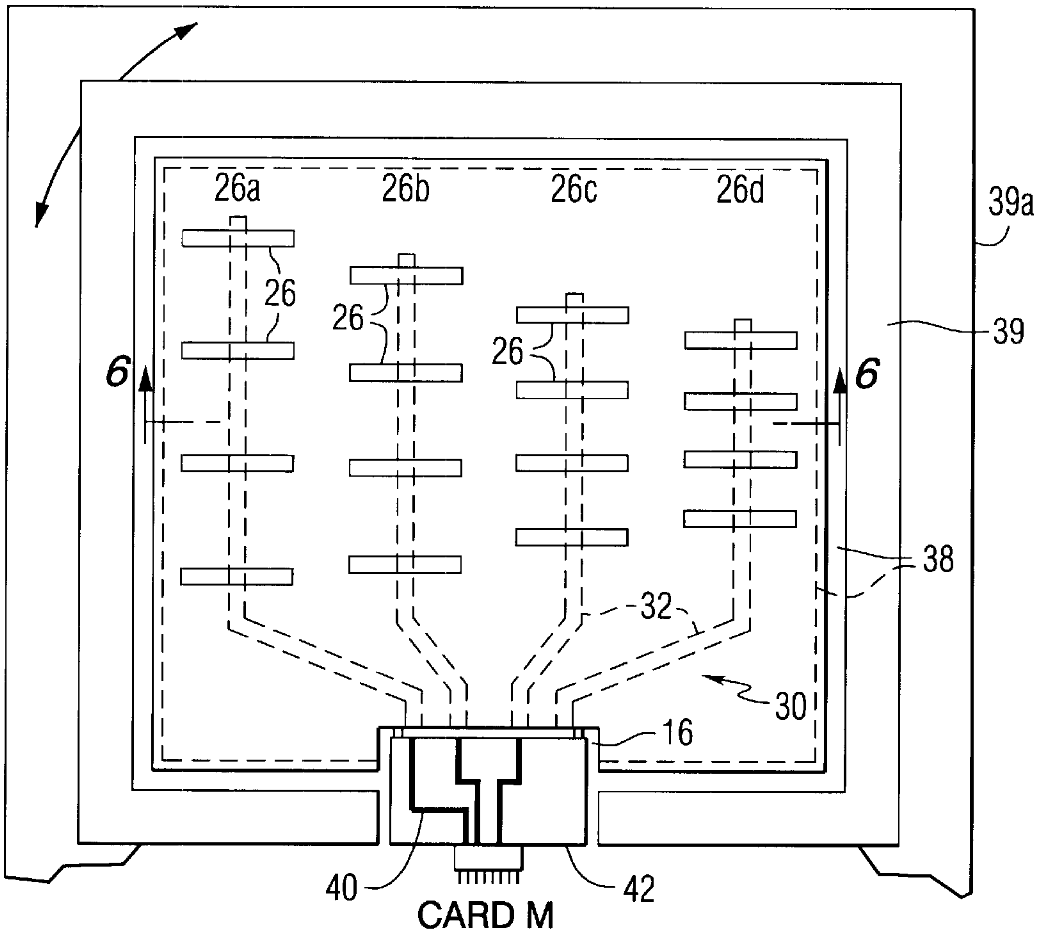
FIG. 5 is an example of a phase array antenna of the present invention showing rows of slots having signal tracks formed as strip lines and extending under the rows of slots, and a plug-in card inserted within the plug-in slot.

FIGS. 1 and 2 illustrate an array antenna 10 of the present invention that is positioned on the chimney 12 of a house and receives television signals from a satellite 14. The array antenna is described herein as a phase array antenna, although the invention is not limited to a phase array antenna. In FIGS. 1 and 5, a plug-in card labeled M is inserted within a plug-in card slot 16 and allows a 40° beam tilt, such as may be required when receiving signals from a satellite in a state such as Maine, as an example only. Naturally, any angles are dependent on which satellite the antenna will be pointed at.

Figure 5A:
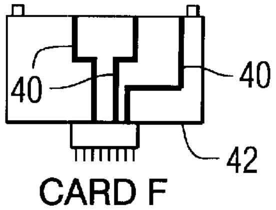
FIG. 5A is another example of a plug-in slot.

FIGS. 2 and 5A show a different plug-in card labeled F that is inserted within a plug-in card slot 16 to give a beam tilt of 60°, such as may be required in Florida.

Figure 3:
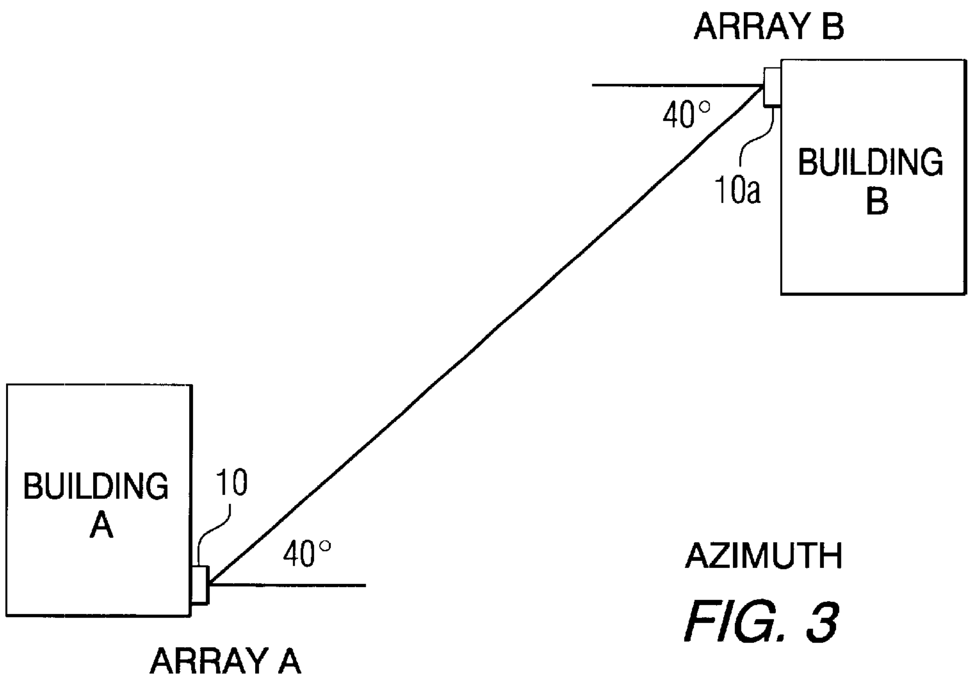
FIGS. 3 and 4 are schematic drawings showing a terrestrial application and respective azimuth and elevation views.
Figure 4:
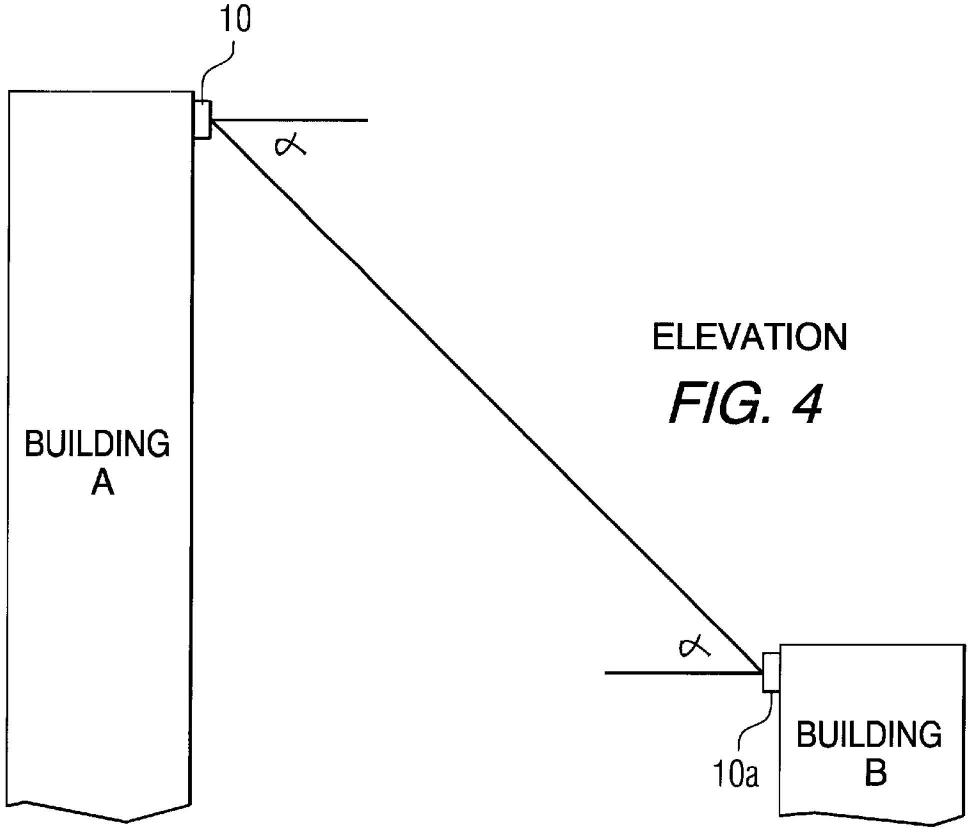

FIGS. 3 and 4 illustrate a terrestrial view using Buildings A and B where an array antenna is positioned on Building A and an array antenna is positioned on Building B and showing both azimuth and elevation views. In this case, azimuth and elevation scanning angles are shown. It should be understood that for terrestrial point-to-point applications, it could be possible to select only azimuth or elevation scan angles with the other axis fixed at some predetermined angle. Scanning in one axis would be less expensive than to have the array antenna with a two axis scan.

Figure 6:
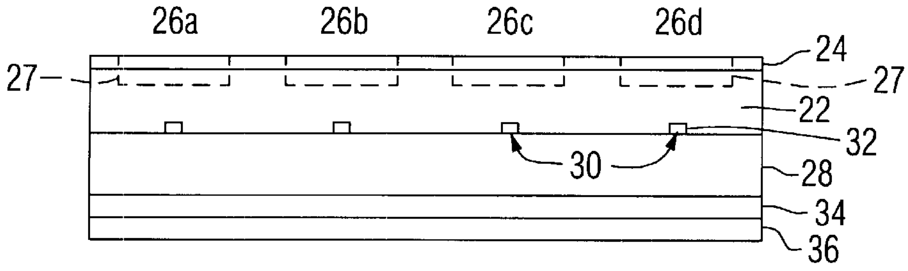
FIG. 6 is a sectional view taken along line 6—6 of FIG. 5.

A phase array antenna 10 of the present invention is shown in greater detail in FIGS. 5 and 6, which illustrate a substantially planar configured phase array antenna having at least one dielectric substrate layer with opposing sides and mounted to a mounting plate 38. FIG. 6 is a sectional view taken along line 6—6 of FIG. 5 and showing two dielectric layers where a first dielectric layer 22 has opposing sides and is formed of a material that is optically transparent. An optically transparent conducting layer 24 is positioned on top of the first dielectric layer 22 and includes radiating slots 26. A second dielectric layer 28 is also formed from a material that is optically transparent and includes a beam forming network 30 formed as microstrip signal tracks 32 that are adhered to the second dielectric layer 28.

A ground plane 34 is positioned on the opposing side of the second dielectric layer 28 and is also optically transparent. An optically transparent adhesive layer 36 is secured on the ground plane 34 and allows the phase array antenna to be applied onto a side of a building or window pane, or in the illustrated embodiment in mounting plate 38. The mounting plate could be positioned in housing 39 that is rotatable relative to support member 39*a* to allow some angular adjustment in that planar orientation.

Different optically transparent materials can be used for the dielectric layers including fluoropolymers or ferroelectrics that exhibit dielectric properties and possess these dielectric properties known to those skilled in the art and are suitable for radio frequency circuit designs. Other materials that could possibly be used include various clear materials as known to those skilled in the art, such as glass, polyester, ceramics, quartz, plastics, resin-based materials, or other known materials. The conductive signal tracks 32 that form the beam forming network 30 and formed as microwave signal tracks can be applied directly to the dielectric by an optically transparent technology, such as indium tin oxide, as is known to those skilled in the art. Other materials could include the AgHT coatings known to those skilled in the art. The optically transparent conducting layer 24 can also be formed from such materials. These optically transparent conductors could also be used to form electrical connections (vias) between different conductor layers within the array.

As illustrated in FIG. 5, the radiating slots 26 are formed in predetermined rows 26*a*–*d*, and the signal tracks, which can be formed as strip lines, extend under respective predetermined rows. A dielectric layer 27, including air, can be interposed between the slots and beam forming network. Other dielectric materials could be used as known to those skilled in the art. Each row can have a predetermined slot spacing and can be dimensioned for receiving a predetermined sensed operating frequency of a received signal. The plug-in card M has selected strip lines 40 that connect to predetermined rows. Naturally, it is possible to have a plug-in card that has one strip line connected to a desired strip line of a predetermined row or number of rows. For example, card M shows the card connecting to three strip lines on rows 26*a*, 26*b* and 26*c*, and card F will be connected to rows 26*b*, 26*c* and 26*d* as shown in FIG. 5A with three strip lines. The cards M,F can be formed with optically transparent dielectric materials and microstrip line technology that is optically transparent, as described above. The cards can be formed in an optically transparent housing 42, such as plastic or other materials, providing a support surface as known to those skilled in the art. The plug-in cards can include phase shifters.

Figure 7:
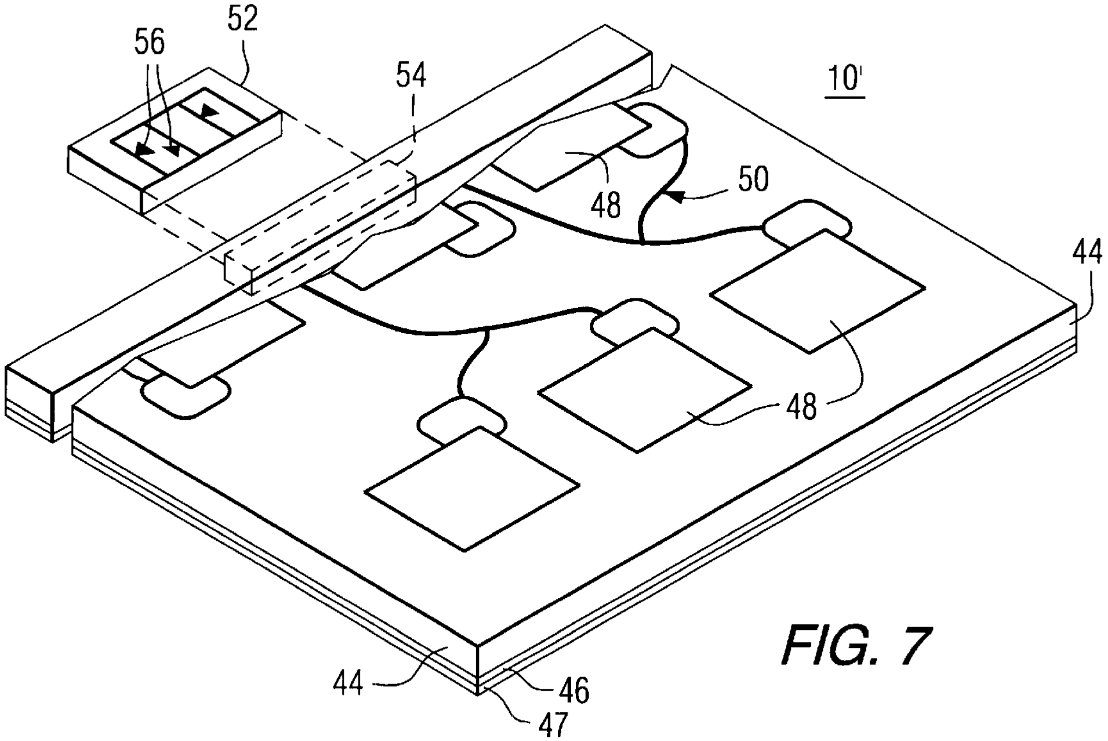
FIG. 7 is a fragmentary, isometric view of another planar array antenna of the present invention showing patch antenna elements formed as optically transparent radiating elements.

FIG. 7 illustrates another embodiment of a phase array antenna 10' of the present invention that is optically transparent using a single dielectric layer that is optically transparent and having an optically transparent ground plane 46 and adhesive layer 47 on one side and optically transparent radiating elements formed as patch antenna elements 48 on the opposite side of the single dielectric layer 44. A beam former network 50 formed of signal tracks is connected to the patch antenna elements 48 and is optically transparent. The signal tracks can be formed by techniques as noted above by conductive patterns applied directly to the dielectric with optically transparent conductive technology, such as the indium tin oxide or other materials discussed. The patch antenna elements 48 are also be formed from the optically transparent material, such as indium tin oxide, or other materials known to those skilled in the art.

A plug-in card 56 is also received into a formed plug-in slot 54. The plug-in card 52 can be similar to what has been described before, except the illustrated card includes phase shifters 56 incorporated within some of the strip lines to cause a phase shift, such as obtained by giving phase differences to different antenna elements that constitute the array. The phase delay can be caused between two adjacent antenna elements and can be adjusted as desired by means of different plug-in cards having different length strip lines and phase shifters. Also, the plug-in cards could be designed to have strip lines or other signal tracks, as known to those skilled in the art, imparting a desired phase shift, and thus, a different scan angle.

Figure 8:
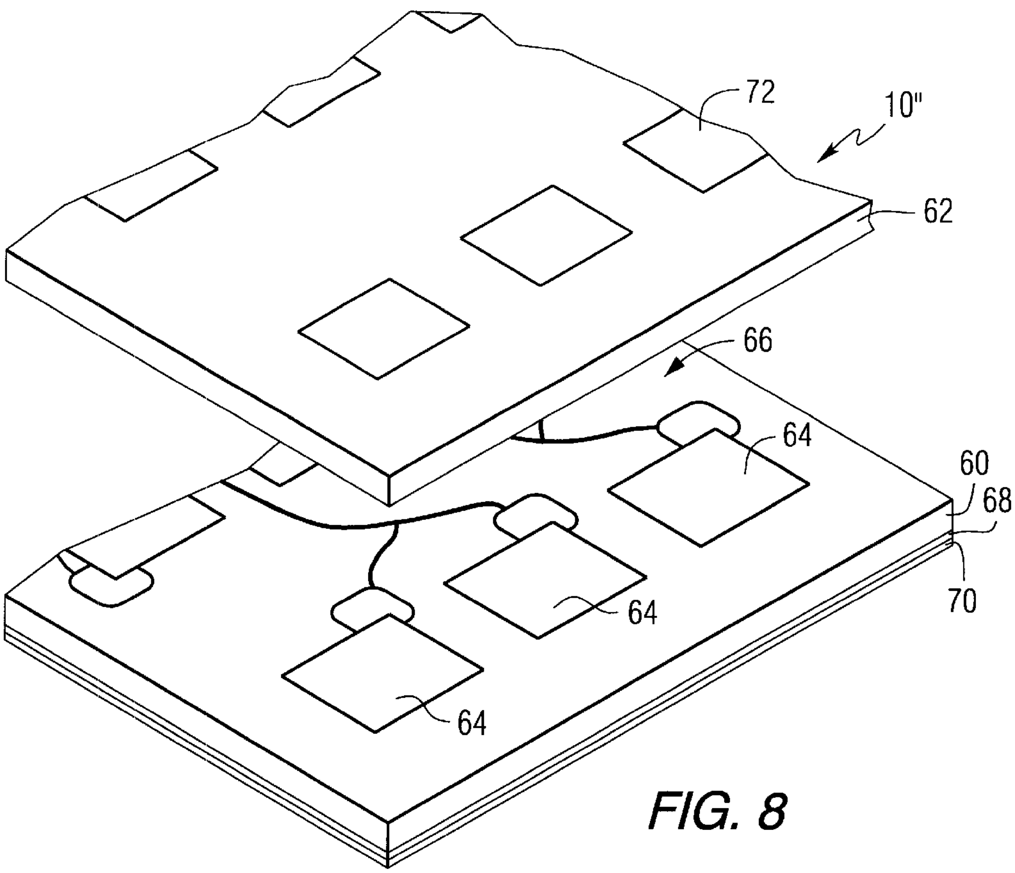
FIG. 8 is an exploded isometric view of another optically transparent phase array antenna of the present invention showing driven and parasitic antenna elements.

FIG. 8 illustrates fragmentary, exploded isometric view of another embodiment of the phase array antenna 10" of the present invention similar to FIG. 7, but using first, lower and second, upper dielectric layers 60,62. The first dielectric layer 60 has opposing sides and is formed of a material that is optically transparent. An array of driven antenna elements 64 are positioned on the top side of the first dielectric layer 60. The driven antenna elements 64 are interconnected by a beam forming network 66 formed from signal tracks as described above that are positioned directly on the first dielectric layer 60. The driven antenna elements 64 and interconnected beam forming network 66 are optically transparent and can be formed by the methods and techniques described above and known to those skilled in the art. A ground plane layer 68 and adhesive layer 70 are positioned on the opposite side of the first dielectric layer and formed with material that is optically transparent.

The second dielectric layer 62 is positioned over the side of the first dielectric layer having the array of driven antenna elements and is also formed of a material that is optically transparent. An array of parasitic antenna elements 72 are formed on the second dielectric layer opposite the driven antenna elements and associated with the driven antenna elements. The optically transparent adhesive layer 70 applied on the ground plane layer can adhesively secure the phase array antenna to a mounting surface.

A plug-in slot (not shown) of the type described above can be operatively connected to the beam forming network and configured for receiving a plug-in card that connects to the beam forming network for imparting a desired phase shift and scanning the beam to a desired location. She plug-in card can be formed similar to previously described plug-in cards.

Figure 6A:
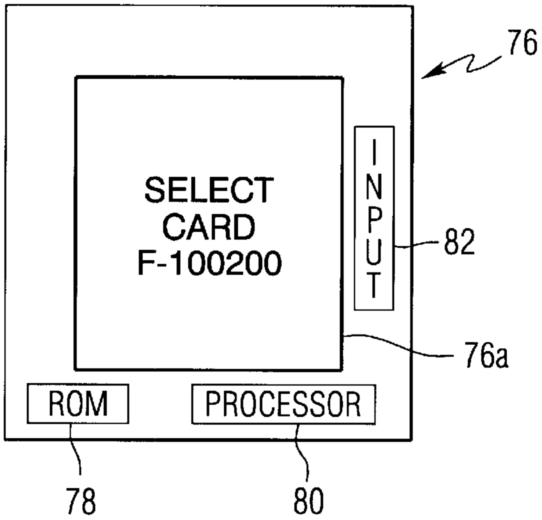
Figure 9:
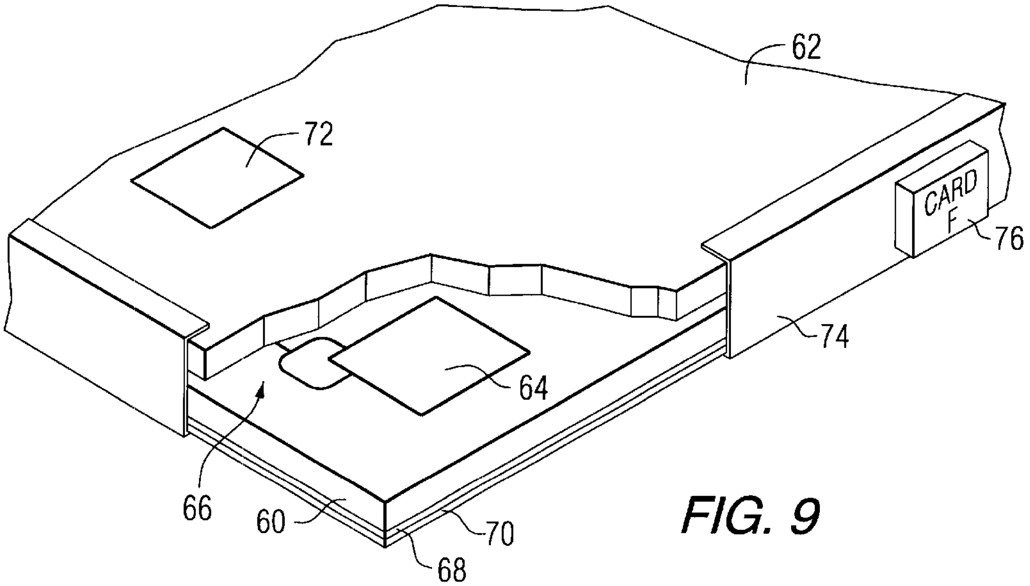
FIG. 9 is another isometric view of a phase array antenna of the present invention similar to FIG. 8.

FIG. 9 illustrates that the phase array antenna 10" of FIG. 8 can be mounted within an antenna housing 74 for mounting on a surface. A directional guide 76 is mounted on housing 74 and indicates direction in which the phase array antenna has been mounted on a surface and can include a display indicating what plug-in card should be received within the plug-in slot. Although not necessary for function of the antenna of the present invention, the directional guide 76 indicates the direction in which the phase array antenna has been mounted on an object, such as a chimney or window pane. For example, the directional guide could indicate that the phase array antenna is mounted in Florida facing south or southeast. A display 76*a* on the directional guide 76 could indicate what plug-in card a user would have to mount within the plug-in slot (FIG. 6A). The directional guide 76 could have a ROM chip 78 and processor 80 and embedded software that allows a user to input via input user interface 82 their geographical location, such as Florida or Maine.

After inputting this geographical information, the directional guide would then determine the orientation of the phase array antenna as it is mounted on the chimney or wall of a house, and based on that determined orientation, indicate on the display what particular plug-in card would best be desirable, such as Ser. No. F100200 (FIG. 6A). The user of the phase array antenna of the present invention could also be directed initially by instructions accompanying he purchase to place the phase array antenna on a certain desired wall, such as north or east wall.

Figure 10:
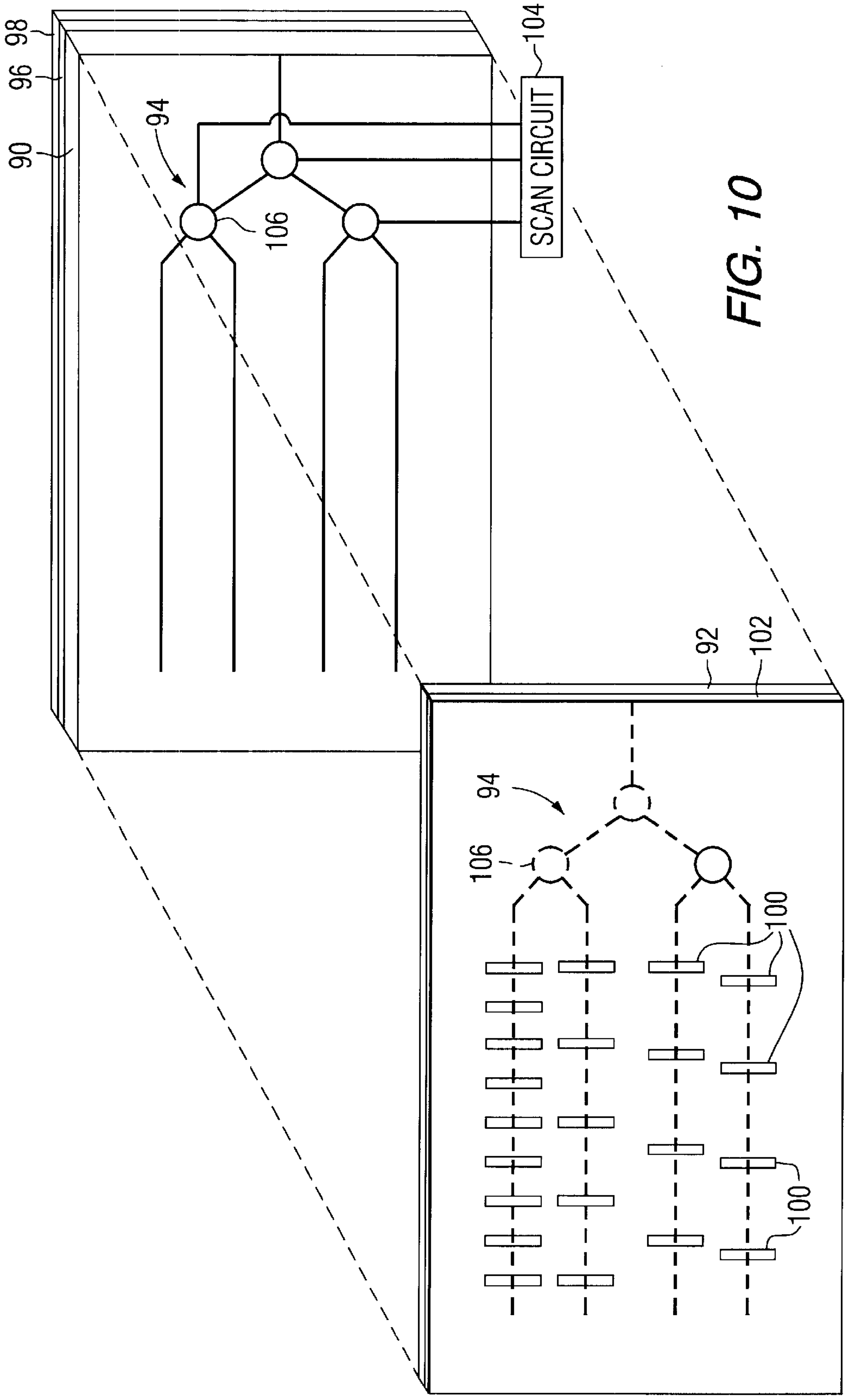
FIG. 10 is an exploded isometric view of a phase array antenna using radio frequency traces as a beam former, and showing a conductive layer forming radiating slots that are positioned over the signal tracks forming the traces.

FIG. 10 illustrates another embodiment of the phase array antenna 10"' of the present invention having first and second dielectric layers 90,92 that are optically transparent. A beam former network 94 is positioned on the first dielectric layer between first and second dielectric layers. A ground plane layer 96 and an adhesive layer 98 is positioned on the backside and radiating slots 100 are formed on a conductive layer 102 positioned on the second dielectric layer 92. A scanning circuit 104 could be connected to the beam former network that is formed as microstrip signal tracks and can include junction points 106 as known to those skilled in the art to allow scanning of various junction points and the phase array.

Figure 11:
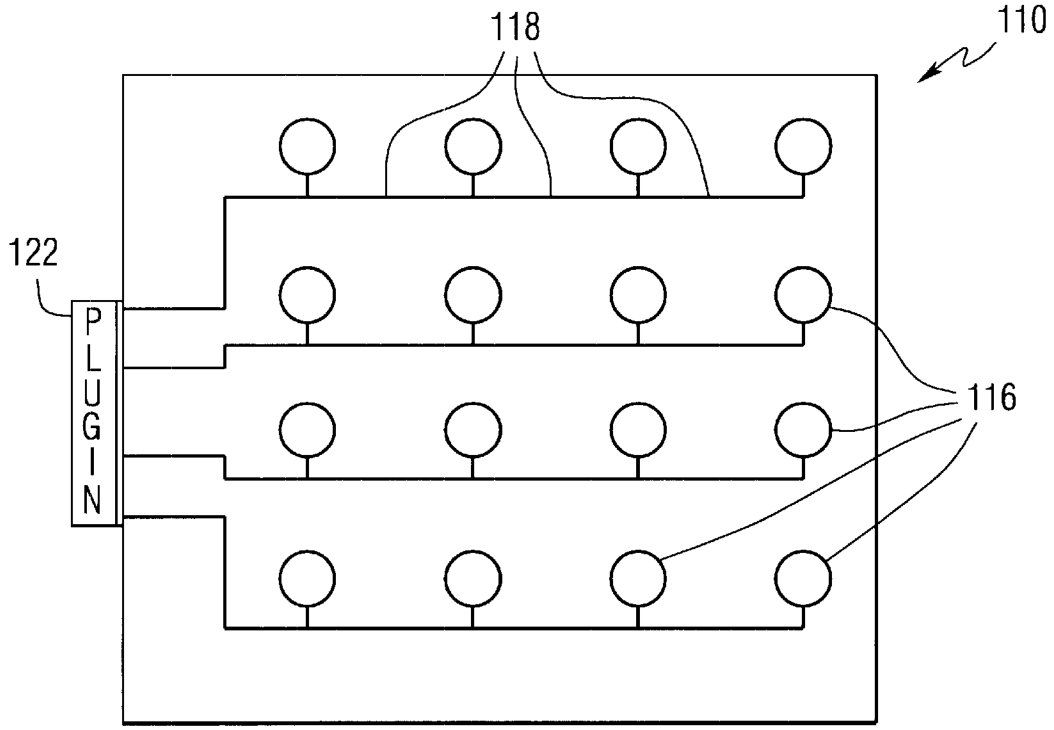
FIGS. 11 and 12 show a ground plane and antenna elements where a beam former is applied onto a window pane forming a phase array antenna of the present invention.
Figure 12:
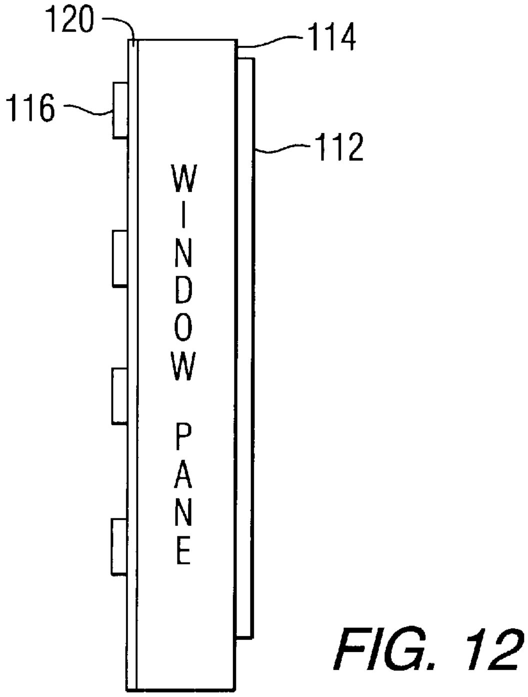

FIGS. 11 and 12 illustrate another embodiment of the phase array antenna 110 of the present invention where a ground plane 112 is positioned on one side of a window pane 114 and is formed from an optically transparent material. The ground plane can be applied by an adhesive layer to the window pane. Optically transparent antenna elements 116 and beam former network 118 are formed on an optically transparent dielectric layer 120 and secured with an appropriate adhesive to the window pane 114. A plan view of the window implementation is shown in FIG. 12 with patch antenna elements formed as the antenna elements. It is possible to also have a plug-in card 122 or other module that would allow a phase shift to be applied between rows only to control the elevation angle or between elements and rows to control azimuth and between rows to control elevation. The ground plane alternatively could be on the same side of the window pane 114 as the antenna elements. The materials that are optically transparent can be formed by techniques and using materials known to those skilled in the art as described above.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A phase array antenna comprising:

a first dielectric layer formed of a material that is optically transparent;

an electrically conductive and optically transparent ground plane layer secured on one side of said first dielectric layer;

a second optically transparent dielectric layer formed over said first dielectric layer, and an optically transparent conducting layer formed on the second dielectric layer and having a plurality of slots that are arranged in a plurality of rows; and an optically transparent beam forming network formed on the first dielectric layer and formed as a plurality of linear microstrip signal tracks, wherein a respective linear microstrip signal track extends under a respective row of slots.

2. The phase array antenna according to claim 1, and further comprising an optically transparent adhesive layer formed on the ground plane layer opposite the dielectric layer for adhesively securing the phase array antenna to a surface.

3. The phase array antenna according to claim 1, wherein said optically transparent beam forming network, antenna elements and ground plane are formed from indium tin oxide.

4. The phase array antenna according to claim 1, wherein each row has a predetermined slot spacing and dimension for receiving a predetermined center operating frequency of a received signal.

5. A phase array antenna comprising:

a dielectric layer having opposing sides and formed of a material that is optically transparent;

an electrically conductive and optically transparent ground plane layer secured on one side of said dielectric layer;

an array of optically transparent antenna elements positioned over the opposing side of the dielectric layer from the ground plane layer;

an optically transparent beam forming network formed on the dielectric layer on the same side as the optically transparent antenna elements, and operatively connected to array of optically transparent antenna elements; and a plug-in card slot operatively connected to said beam forming network and configured for receiving a plug-in card and connecting to a beam forming network contained within the plug-in card for imparting a desired phase shift and scanning the beam to a desired location.

6. The phase array antenna according to claim 5, and further comprising a directional guide for indicating direction in which the phase array antenna has been mounted on surface, and including a display indicating what plug-in card should be received within the plug-in slot.

7. The phase array antenna according to claim 5, and further comprising an optically transparent adhesive layer formed on the ground plane layer opposite the dielectric layer for adhesively securing the phase array antenna to a surface.

8. The phase array antenna according to claim 5, wherein said optically transparent beam forming network is formed from indium tin oxide.

9. The phase array antenna according to claim 5, wherein said beam forming network comprises microstrip signal tracks.

10. The phase array antenna according to claim 5, wherein said antenna elements comprise radiating patch antenna elements.

11. The phase array antenna according to claim 5, wherein said antenna elements comprise slots that are arranged in rows, wherein said beam forming network comprises microstrip signal tracks that extend under respective slots.

12. The phase array antenna according to claim 11, and further comprising a second optically transparent dielectric layer formed over said dielectric layer having the attached ground plane layer, and an optically transparent conducting layer formed on the second dielectric layer and having the slots formed therein.

13. The phase array antenna according to claim 11, wherein each row has a predetermined slot spacing and dimension for receiving a predetermined center operating frequency of a received signal.

14. A phase array antenna comprising:

a first dielectric layer having opposing sides and formed of a material that is optically transparent;

an array of driven antenna elements and interconnected beam forming network positioned directly on one side of the first dielectric layer, wherein said array of driven antenna elements and interconnected beam forming network are optically transparent;

a ground plane layer positioned on the opposing side of the first dielectric layer and formed of a material that is optically transparent;

a second dielectric layer positioned over the side of the first dielectric layer having the array of driven antenna elements and formed of a material that is optically transparent;

an array of parasitic antenna elements formed on the second dielectric layer opposite the driven antenna elements; and an optically transparent adhesive layer applied on the ground plane layer for adhesively securing the phase array antenna to a surface.

15. The phase array antenna according to claim 14, wherein said beam forming network comprises a plurality of microstrip signal tracks.

16. The phase array antenna according to claim 14, and further comprising a plug-in slot operatively connected to said beam forming network and configured for receiving a plug-in card and connecting to a beam forming network contained within the plug-in card for imparting a desired phase shift and scanning the beam to a desired location.

17. The phase array antenna according to claim 16, and further comprising a directional guide for indicating direction in which the phase array antenna has been mounted on a surface, and including a display indicating what plug-in card should be received within the plug-in slot.

18. The phase array antenna according to claim 14, wherein said beam forming network is formed from indium tin oxide.

19. A phase array antenna comprising:

a window glass pane having opposing sides;

a conductive ground plane attached to one side of the window glass pane, wherein the conductive ground plane is formed of a material that is optically transparent;

an array of antenna elements secured on the opposing side of the window glass pane from the conductive ground plane and arranged in a plurality of rows;

a beam forming network secured on the window glass pane and connected to the array of antenna elements; and a phase shifter connected to the beam forming network for imparting a desired phase shift to the antenna elements and controlling one of at least elevation or azimuth.

20. The phase array antenna according to claim 19, wherein said phase shifter applies a phase shift between rows of antenna elements to control an elevation angle.

21. The phase array antenna according to claim 19, wherein said phase shifter applies a phase shift between antenna elements contained within rows to control azimuth.

* * * * *

UNITED STATES PATENT AND TRADEMARK OFFICE

CERTIFICATE OF CORRECTION

PATENT NO. : 6,388,621 B1

DATED : May 14, 2002

INVENTOR(S) : Lynch

It is certified that error appears in the above-identified patent and that said Letters Patent is hereby corrected as shown below:

Column 1,
Line 16, delete "arid" substitute -- and --
Line 47, delete "Lilt" substitute -- tilt --

Column 6,
Line 14, delete "She" substitute -- The --

Signed and Sealed this

Ninth Day of July, 2002

*Attest:*

JAMES E. ROGAN

*Attesting Officer*

*Director of the United States Patent and Trademark Office*